(12) United States Patent
Bullard et al.

(10) Patent No.: US 11,727,455 B2
(45) Date of Patent: *Aug. 15, 2023

(54) UNPAID ITEM RISK MANAGEMENT

(71) Applicant: eBay Inc., San Jose, CA (US)

(72) Inventors: Jonathan Michael Bullard, San Jose, CA (US); Shawn D. Lindberg, Salt Lake City, UT (US); Ashish Chhabra, San Jose, CA (US)

(73) Assignee: EBAY INC., San Jose, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 16/561,302

(22) Filed: Sep. 5, 2019

(65) Prior Publication Data
US 2019/0392497 A1 Dec. 26, 2019

Related U.S. Application Data

(63) Continuation of application No. 14/293,799, filed on Jun. 2, 2014, now Pat. No. 10,423,994.

(51) Int. Cl.
*G06Q 30/00* (2023.01)
*G06Q 30/0601* (2023.01)
*G06Q 30/08* (2012.01)

(52) U.S. Cl.
CPC ......... *G06Q 30/0609* (2013.01); *G06Q 30/08* (2013.01)

(58) Field of Classification Search
CPC .......................... G06Q 30/0609; G06Q 30/08
USPC ................................................ 705/26.1–27.2
See application file for complete search history.

(56) References Cited

U.S. PATENT DOCUMENTS

| | | | |
|---|---|---|---|
| 8,438,068 B2 | 5/2013 | Kirovski et al. |
| 8,583,535 B2 | 11/2013 | Odom et al. |
| 10,423,994 B2 | 9/2019 | Bullard et al. |
| 2010/0043055 A1 | 2/2010 | Baumgart |
| 2010/0100483 A1 | 4/2010 | Lin et al. |
| 2011/0106605 A1 | 5/2011 | Malik et al. |
| 2015/0348150 A1 | 12/2015 | Bullard et al. |

FOREIGN PATENT DOCUMENTS

WO 2015/187672 A1 12/2015

OTHER PUBLICATIONS

"CyberSource introduces most sophisticated internet fraud tool foreCommerce", Retrieved from https://dialog.proquest.com/professional/docview/668787734?accountid=142257. 1999, 5 pages. (Year: 1999).*
Advisory Action received for U.S. Appl. No. 14/293,799, dated Jun. 19, 2017, 5 pages.
Applicant-Initiated Interview Summary received for U.S. Appl. No. 14/293,799, dated Feb. 23, 2017, 3 pages.
(Continued)

*Primary Examiner* — Anand Loharikar
(74) *Attorney, Agent, or Firm* — Schwegman Lundberg & Woessner, P.A.

(57) ABSTRACT

In an example embodiment, information about a buyer in an ecommerce system is obtained. An unpaid item risk assessment is calculated for the buyer, the unpaid item risk assessment calculating a risk that the buyer will not pay for an item on which the buyer bids. A bid limit is then established based on the unpaid item risk assessment. A bid from the buyer may then later be blocked based on the bid limit.

20 Claims, 6 Drawing Sheets

(56) References Cited

OTHER PUBLICATIONS

Applicant-Initiated Interview Summary received for U.S. Appl. No. 14/293,799, dated May 19, 2017, 3 pages.
Final Office Action received for U.S. Appl. No. 14/293,799, dated Apr. 6, 2017, 9 pages.
Non-Final Office Action received for U.S. Appl. No. 14/293,799, dated Nov. 17, 2016, 22 pages.
Non-Final Office Action received for U.S. Appl. No. 14/293,799, dated Jun. 18, 2018, 9 pages.
Notice of Allowance Received for U.S. Appl. No. 14/293,799, dated Jan. 30, 2019, 9 pages.
Notice of Allowance received for U.S. Appl. No. 14/293,799, dated May 22, 2019, 7 pages.
Response to Final Office Action filed on Jun. 2, 2017, for U.S. Appl. No. 14/293,799, dated Apr. 6, 2017, 10 pages.
Response to Non-Final Office Action filed on Feb. 17, 2017, for U.S. Appl. No. 14/293,799, dated Nov. 17, 2017, 8 pages.
Response to Non-Final Office Action filed on Sep. 17, 2018, for U.S. Appl. No. 14/293,799, dated Jun. 18, 2018, 12 pages.
"CyberSource introduces most sophisticated internet fraud tool for eCommerce", Retrieved from https://dialog.proquest.com/professional/docview/668787734?accountid=142257 (Year: 1999), 1999, 5 pages.
International Preliminary Report on Patentability received for PCT Application No. PCT/US2015/033751, dated Dec. 15, 2016, 7 pages.
International Search Report received for PCT Application No. PCT/US2015/033751, dated Aug. 25, 2015, 2 pages.
Written Opinion received for PCT Application No. PCT/US2015/033751, dated Aug. 25, 2015, 5 pages.

\* cited by examiner

UNPAID ITEM RISK MANAGEMENT

CLAIM OF PRIORITY

This Application is a continuation of U.S. application Ser. No. 14/293,799, filed Jun. 2, 2014, which is hereby incorporated by reference in its entirety.

TECHNICAL FIELD

This disclosure relates generally to the management of risk in an electronic commerce environment. More particularly, this disclosure relates to risk management with regards to unpaid items.

BACKGROUND

In an electronic commerce ("ecommerce") environment, many transactions are conducted in a manner in which a buyer pays for an item (e.g., causes a credit card transaction to commence) at the same time as the buyer is committing to purchase the item. For example, a buyer may place an item in a shopping cart and "check out". The check out process can then involve both committing to purchase the item and establishing the payment for the item.

In other ecommerce environments, however, the act of committing to purchase an item may be separate from the act of paying for an item. One example is in the realm of online auctions, where a buyer may enter a bid for an item without knowing whether or not the bid will be successful. A successful bid automatically can turn into a commitment to purchase when the auction closes, but the buyer may not pay for the item until later. Unfortunately this can create an opportunity for malicious and/or unreliable users to create havoc with the system by, either intentionally or unintentionally, committing to purchase items without ever paying for them. In an auction scenario, this results in the seller either needing to contact another buyer who bid on the item to see if they wish to purchase for the "presumably lower" second place bid, after waiting a reasonable period of time for the original "buyer" to pay, or even needing to relist the auction and start over, wasting time. This can be especially damaging if a seller is in a rush to sell the item, such as wanting to get rid of the item due to an impending move. This problem can also occur in non-auction scenarios, where a seller will wind up holding the item and preventing other potential buyer from purchasing it while waiting for the "original buyer" to pay, causing potential lost sales.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, unpaid item risk exposure is reduced by taking a variety of actions in response to unpaid items. A risk analysis component can utilize information on the number of unpaid items for a buyer, as well as other information that aids in evaluating the risk of the buyer being malicious or otherwise not intending to pay for items. The risk analysis component can then identify one or more limits on the buyer to be implemented based on the evaluated risk.

Figure 1:
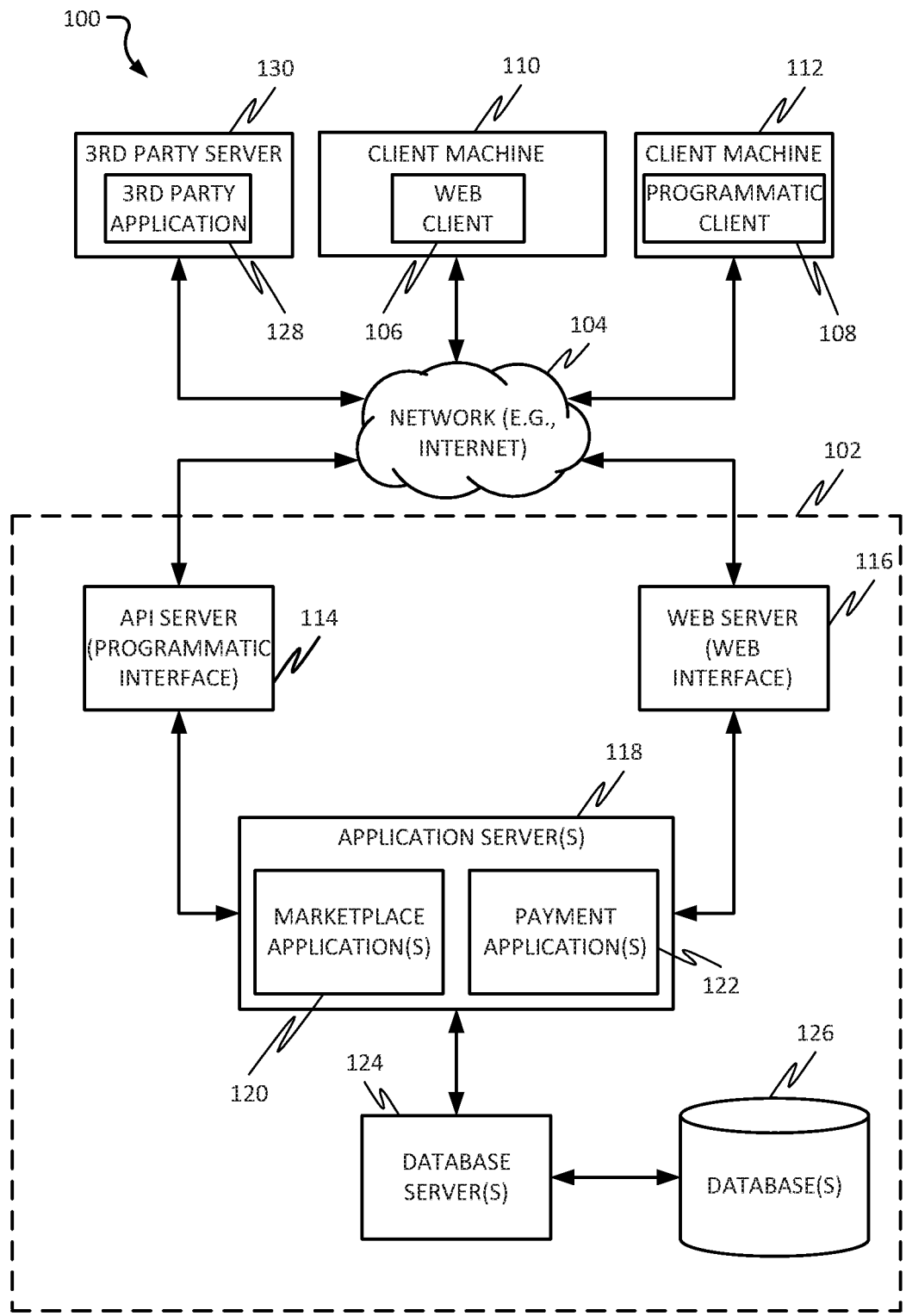
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer® browser developed by Microsoft® Corporation of Redmond, Washington State) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the Turbo Lister application developed by eBay Inc., of San Jose, Calif.) to enable sellers to author and manage listings on the networked system 102 in an offline manner, and to perform batch-mode communications between the programmatic client 108 and the networked system 107.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
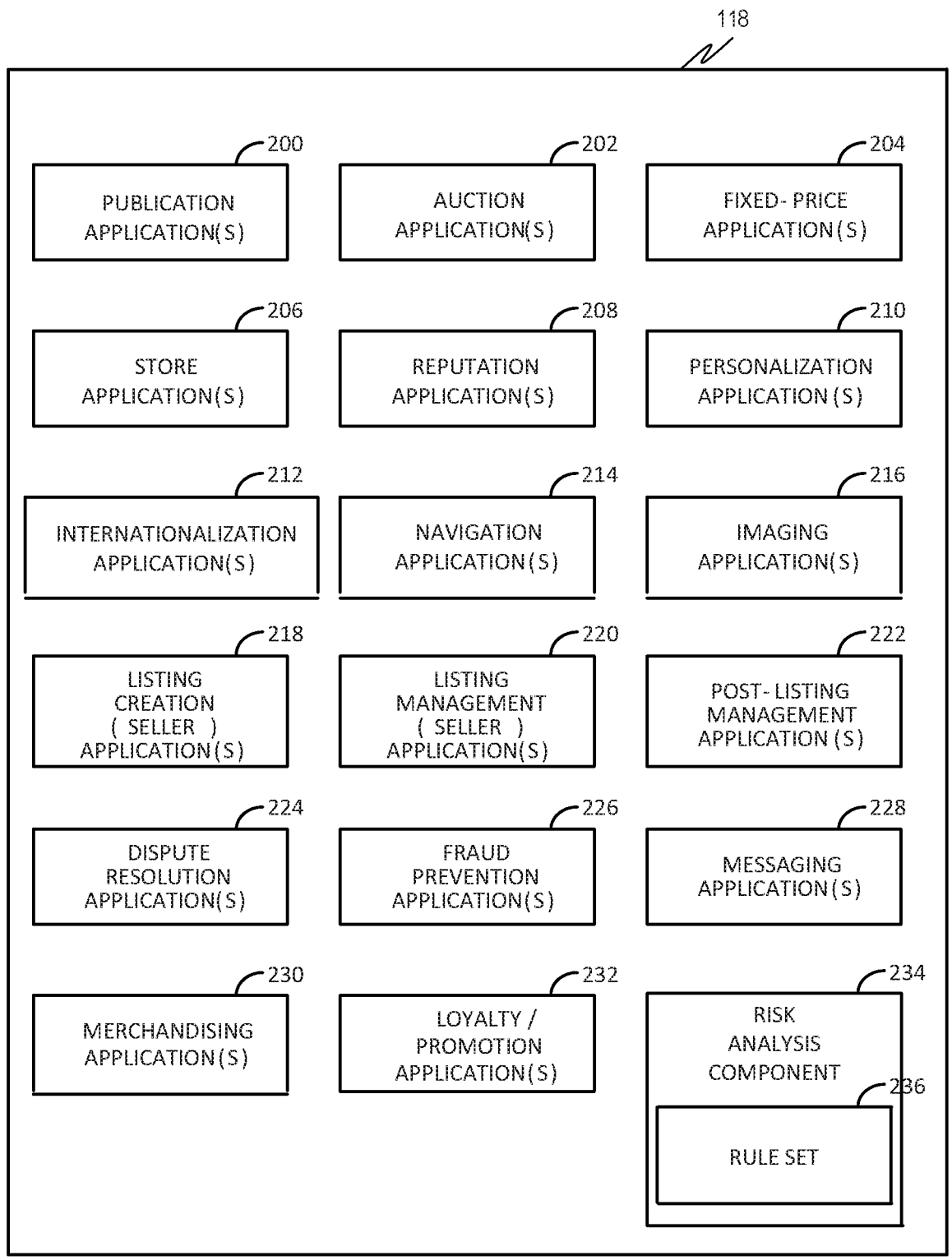
FIG. 2 is a block diagram illustrating marketplace and payment applications that, in one example embodiment, are provided as part of (an) application server(s) in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example, a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized liar the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browse applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotion points for each transaction established and/or concluded with a particular seller, and be offered a reward for which accumulated loyalty points can be redeemed.

A risk analysis component 234 can be designed to evaluate the risk of a buyer not paying for an item that he or she has committed to (or will commit to) purchase. A rule set 236 may be used to identify one or more limits to place on the buyer's account based on the evaluated risk. These limits may then be passed to, for example, the auction application(s) 202, the fixed-price application(s) 204, or any other runtime system that has the ability to limit the buyer based on the identified limits.

As described briefly above, limits may be placed on a buyer based on an evaluation of the risk that the buyer will not pay for an item or items. This risk may be called the "unpaid item risk" and may be calculated at a variety of different granularities. The unpaid item risk may be calculated based on, for example, a risk that a particular buyer will not pay for a particular item, a risk that a particular buyer will not pay for a grouping of items (e.g., items in a particular category or above a certain price range), or a general risk that the particular buyer will not pay for items in general. It should be noted that the term "buyer" as used in this disclosure shall be interpreted broadly to cover all users who have committed to purchase (whether or not payment has ever been made from the user) as well as users who are going to be using an interface to attempt to commit to purchase an item. In other words, a first-time user of an ecommerce system who has never committed to purchase an item before, let alone paid for an item, will still be considered a "buyer" for purposes of this disclosure, as the system may wish to evaluate the risk of this first-time buyer not paying.

Figure 3:
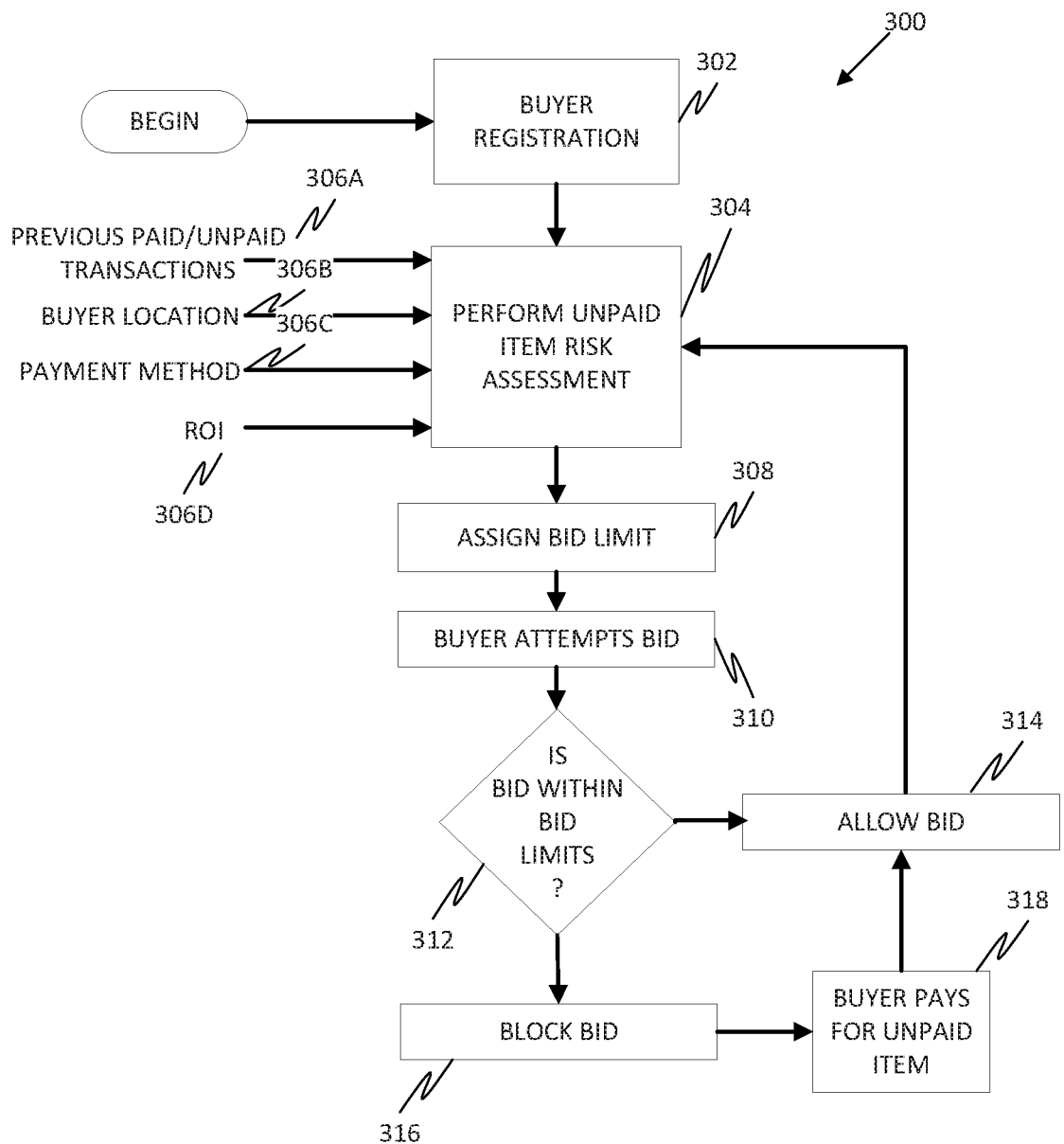
FIG. 3 is a flow diagram illustrating a method, in accordance with an example embodiment, of limiting bids in an ecommerce system.

FIG. 3 is a flow diagram illustrating a method 300, in accordance with an example embodiment, of limiting bids in an ecommerce system. At operation 302, a buyer can register with the ecommerce system. This may include, for example, providing one or more pieces of profile information. In its simplest form, this registration may only provide anonymous identification information, such as a user name and password, which will not be very helpful in determining risk analysis, beyond linking the account with purchases made and thus allowing the system to track the number of unpaid items from the account. In other example embodiments, however, additional information is provided that may be used either directly or indirectly to determine an unpaid item risk. This may include, for example, identifying information such as a real name, social security number, credit card information, etc., or other information that could be used to search one or more databases for information related to the user (e.g., a credit check could be performed). It also could include, for example, profile information such as user age, gender, location, interests, etc. that could be used to make general risk assessments.

At operation 304, unpaid item risk assessment is performed. As described above, a number of different pieces of input information could be utilized in making this assessment. In the example depicted in FIG. 3, this may include previous paid/unpaid transactions 306A, buyer location 306B, payment method on file 306C, and return on investment 306D. Previous paid/unpaid transactions 306A may be communicated in a number of different ways, such as an absolute value of the number of paid and/or unpaid transactions, as well as a percentage value indicating the relative ratio between paid and unpaid transactions. Buyer location 306B may be determined in a number of different ways. In one example embodiment, the buyer location 306B is retrieved from a user profile. In another example embodiment, the buyer location 306B is determined dynamically via, for example, a global positioning system (GPS) module in a user device of the buyer, or via a reverse lookup of an Internet Protocol (IP) address being utilized by the buyer.

Payment method on file 306C may indicate, for example, whether a credit card, a debit card, or bank account information (or none of the above) is on file for the user. It may also indicate additional information about the accounts. For example, the information may distinguish between credit cards from one (e.g., reliable) bank and credit cards from another (e.g., unreliable) bank.

Return on investment 306D may indicate, for example, a value associated with the buyer with regards to how valuable the buyer is to the ecommerce system. This may be based on, for example, the number and total value of purchases made by the user over a certain time frame (e.g., past 6 months).

Some of these pieces of information are not really relevant to or otherwise don't pertain to an unpaid item risk assessment made when the buyer first registers for the ecommerce system. For example, a new buyer to the ecommerce system will not have paid or unpaid transaction, or a return on investment, yet. As will be seen later, however, the unpaid item risk assessment may be repeated on a periodic or ad hoc basis as the buyer utilizes the system, and thus these pieces of information may have more relevancy and/or data associated with them at a later time.

Other pieces of information not depicted may also be relevant to the unpaid item risk assessment. These may include, for example, overall usage history on the ecommerce system.

In another example embodiment, a whitelist may be utilized to identify buyers who should have no bid limit despite any unpaid item risk assessment. These may include, for example, buyers who have a long-established record of payment. In another example embodiment, a blacklist may be utilized to identify buyers who should always have a bid limit despite any unpaid item risk assessment.

At operation 308, a bid limit is assigned based on the unpaid item risk assessment. It should be noted that the term "bid" as used in this disclosure should be interpreted broadly to cover any commitment to purchase an item under any circumstances. This could cover, for example, a traditional "bid" in an auction, where the user is committing to purchase the item if the bid is accepted, but also non-auction commitments, such as "buy it now" items, offers to purchase, or other fixed-price offerings.

The bid limit is any limitation placed on the user's ability to bid. In one example embodiment, this may be a limit on the number of unpaid items the buyer can have. For example, the system could determine that the buyer will be allowed no more than 5 unpaid items. If the buyer attempts to place a bid while having 5 unpaid items, the bid may be blocked until the buyer pays for one of the 5 unpaid items. A counter may be established for a buyer to track this value, such that the counter is incremented each time a successful bid occurs and is decremented each time a payment is made. A limit on unpaid items, however, is only one example of a bid limit that could be imposed. Other bid limits, such as limiting bids in certain categories, limiting bids over certain amounts, requiring immediate payment at bid time, etc., may be implemented either in addition to or in lieu of an unpaid item limit.

At operation 310, the buyer attempts a bid. At operation 312, it may be determined if the buyer is within the bid limit assigned at operation 308. If so, the bid is allowed at operation 314 and the process returns to operation 304, where the unpaid item risk assessment may be repeated based on updated information, to be used with respect to future bids. This updated information may include, for example, an update of the number of paid/unpaid items. It should be noted that this repetition of the payment risk assessment can be performed either immediately after operation 314, or at some later time. In other words, reassessment could be directly triggered by the allowance of a bid, or can be triggered via some other process, such as another user action, or may simply occur on a periodic basis.

If at operation 312 it is determined that the buyer is not within the bid limit, then at operation 316 the bid is blocked. At operation 318, the buyer makes a payment on an unpaid item and thus the process proceeds to allow the bid at operation 314. Of course, this example assumes that the bid limit pertains to a limit on a number of unpaid items or is some other limit that is somehow mitigated by the act of the buyer making a payment on an unpaid item. If this is not the case, then operation 318 may not be present and the bid may simply be blocked, unless some other action is taken to mitigate the bid limit.

Figure 4:
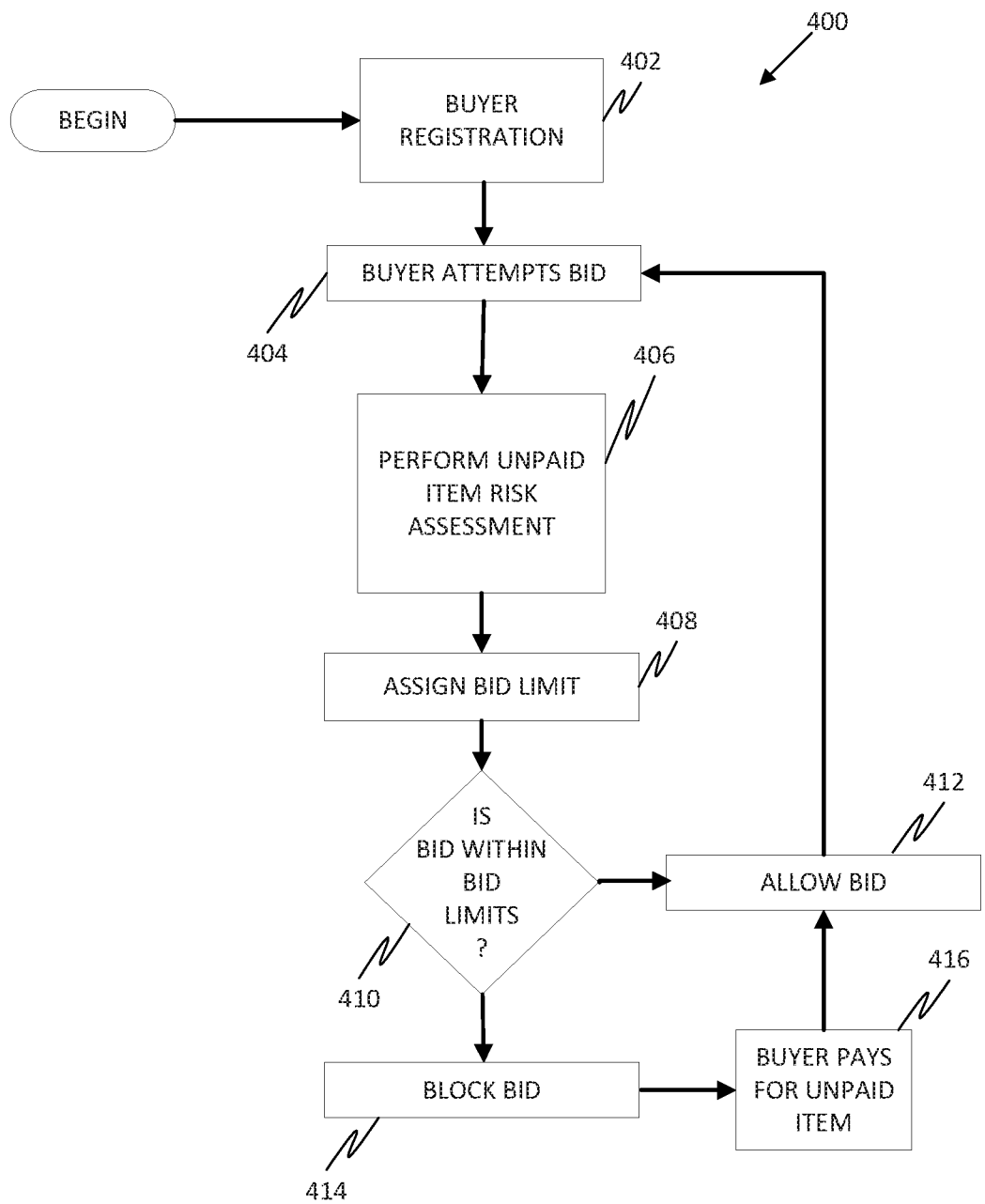
FIG. 4 is a flow diagram illustrating a method, in accordance with another example embodiment, of limiting bids in an ecommerce system.

FIG. 4 is a flow diagram illustrating a method 400, in accordance with another example embodiment, of limiting bids in an ecommerce system. Here, the unpaid item risk assessment is performed dynamically as bidding occurs. At operation 402, the buyer registers for the ecommerce system. At operation 404, the buyer attempts a bid on an item. At operation 406, an unpaid item risk assessment is performed on the buyer. Although they are not pictured, this operation may take as input any of the pieces of information described earlier, such as those described with respect to the risk assessment in operation 304 of FIG. 3. At operation 408, a bid limit is assigned based on the unpaid item risk assessment. At operation 410, it is determined if the buyer is within the bid limit. If so, then at operation 412, the bid is allowed. If not, then at operation 414 the bid is blocked. At operation 416, the buyer makes a payment on an unpaid item and thus the process proceeds to allow the bid at operation 412. As with in FIG. 3, this example assumes that the bid limit pertains to a limit on a number of unpaid items or is some other limit that is somehow mitigated by the act of the buyer making a payment on an unpaid item. If this is not the case, then operation 416 may not be present and the bid may simply be blocked, unless some other action is taken to mitigate the bid limit.

Example Mobile Device

Figure 5:
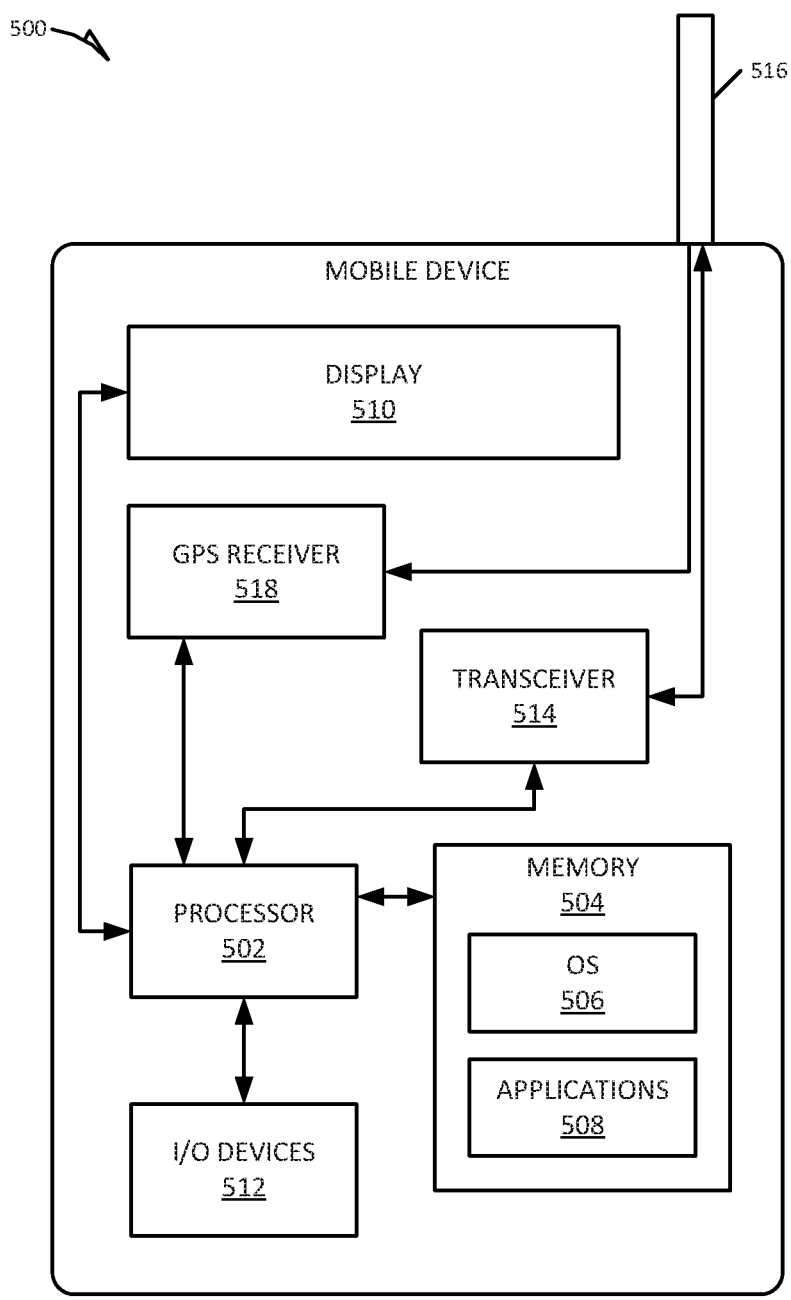
FIG. 5 is a block diagram illustrating a mobile device, according to an example embodiment.

FIG. 5 is a block diagram illustrating a mobile device 500, according to an example embodiment. The mobile device 500 may include a processor 502. The processor 502 may be any of a variety of different types of commercially available processors suitable for mobile devices (for example, an XScale architecture microprocessor, a microprocessor without interlocked pipeline stages (MIPS) architecture processor, or another type of processor 502). A memory 504, such as a random access memory (RAM), a flash memory, or other type of memory, is typically accessible to the processor 502. The memory 504 may be adapted to store an operating system (OS) 506, as well as applications 508, such as a mobile location-enabled application that may provide location-based services (LBSs) to a user. The processor 502 may be coupled, either directly or via appropriate intermediary hardware, to a display 510 and to one or more input/output (I/O) devices 512, such as a keypad, a touch panel sensor, a microphone, and the like. Similarly, in some embodiments, the processor 502 may be coupled to a transceiver 514 that interfaces with an antenna 516. The transceiver 514 may be configured to both transmit and receive cellular network signals, wireless data signals, or other types of signals via the antenna 516, depending on the nature of the mobile device 500. Further, in some configurations, a GPS receiver 518 may also make use of the antenna 516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 502 or processor-implemented modules. The performance of certain of the operations may be distributed among the one or more processors 502, not only residing within a single machine, but deployed across a number of machines. In some example embodiments, the processor 502 or processors 502 may be located in a single location (e.g., within a home environment, an office environment, or a server farm while in other embodiments the processors 502 may be distributed across a number of locations.

The one or more processors 502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 502, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 502 executing a computer program to perform functions by operating on input data and generating output. Method operations can also be performed by, and apparatus of example embodiments may be implemented as, special-purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 502), or in a combination of permanently and temporarily configured hardware may be a design choice. Below are set out hardware (e.g., machine) and software architectures that may be deployed, in various example embodiments.

Example Machine Architecture and Machine-Readable Medium

Figure 6:
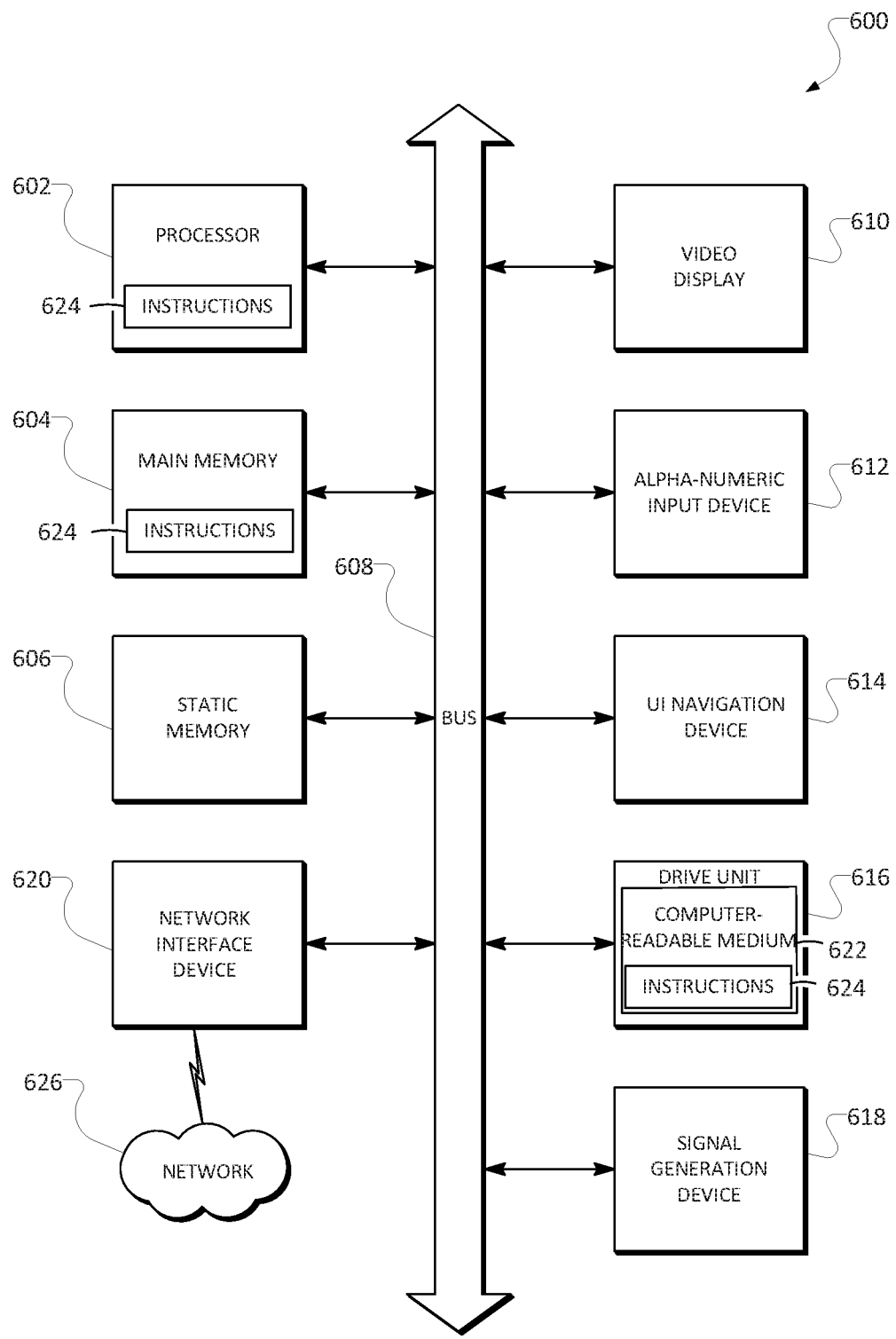
FIG. 6 is a block diagram of machine in the example form of a computer system within which instructions may be executed for causing the machine to perform any one or more of the methodologies discussed herein.

FIG. 6 is a block diagram of a machine in the example form of a computer system 600 within which instructions 624 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) f instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation (e.g., cursor control) device 614 (e.g., a mouse), a drive unit 616, a signal generation device 618 (e.g., a speaker) and a network interface device 620.

Machine-Readable Medium

The drive unit 616 includes a computer-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting computer-readable media 622.

While the computer-readable medium 622 is shown in an example embodiment to be a single medium, the term "computer-readable medium" may include a single medium or multiple media (e.g., a centralized or distributed database, and/or associated caches and servers) that store the one or more instructions 624 or data structures. The term "computer-readable medium" shall also be taken to include any tangible medium that is capable of storing, encoding or carrying instructions 624 for execution by the machine and that cause the machine to perform any one or more of the methodologies of the present disclosure, or that is capable of storing, encoding or carrying data structures utilized by or associated with such instructions 624. The term "computer-readable medium" shall accordingly be taken to include, but not be limited to, solid-state memories, and optical and magnetic media. Specific examples of computer-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions 624 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
a runtime system executable by a processor and configured to operate an ecommerce system where buyers bid on items, a bid being a commitment to purchase an item; and
the runtime system further configured to perform operations comprising:
receiving a first action in a user interface, the first action corresponding to a first bid request from the buyer in an online auction system;
comparing a bid counter for the buyer to a bid limit;
determining that the bid counter is less than the bid limit;
based on the determining that the bid counter is less than the bid limit, granting the first bid request to allow the bid to execute;
in response to granting the first bid request, accessing information associated with the buyer comprising one or more previous transactions to analyze one or more different pieces of information to perform an unpaid item risk assessment to allow or prevent future bid requests received from the buyer in the online auction system, the bid limit being updated based on the unpaid item risk assessment that has been performed based on the analysis of the different pieces of information associated with the one or more transactions;
incrementing the bid counter;
receiving a second action in the user interface, the second action corresponding to a second bid request from the buyer;
comparing the bid counter for the buyer to the updated bid limit;
determining that the bid counter exceeds the updated bid limit; and
based on the determining that the bid counter exceeds the updated bid limit, causing the user interface to reject the second bid request to block the second bid request from executing.

2. The system of claim 1, wherein payment for the item occurs separately from bidding for the item, such that it is possible for the buyer to bid for the item without ever paying for the item.

3. The system of claim 1, wherein the bid limit is based on an assessment of risk that the buyer will not pay for the item after bidding for the item.

4. The system of claim 3, wherein the assessing of the risk that the buyer will not pay for the item after bidding for the item is performed in response to the bid from the buyer.

5. The system of claim 1, wherein the unpaid item risk assessment is performed in response to user action.

6. The system of claim 1, wherein the bid limit establishes a limit on a number of outstanding unpaid items that the buyer can have prior to future bids being blocked.

7. The system of claim 6, wherein the limit varies depending on item category.

8. The system of claim 6, wherein the limit varies depending on item price.

9. The system of claim 6, wherein the limit restricts bidding in one or more specific item categories.

10. A method comprising:
receiving, by one or more processors, a first action in a user interface, the first action corresponding to a first bid request from a buyer in an online auction system;
comparing, by the one or more processors, a bid counter for the buyer to a bid limit;
determining, by the one or more processors, that the bid counter is less than the bid limit;
based on the determining that the bid counter is less than the bid limit, granting the first bid request to allow the bid to execute;
in response to granting the first bid request, accessing information associated with the buyer comprising one or more previous transactions to analyze one or more different pieces of information to perform an unpaid item risk assessment to allow or prevent future bid requests received from the buyer in the online auction system, the bid limit being updated based on the unpaid item risk assessment that has been performed based on the analysis of the different pieces of information associated with the one or more transactions;
incrementing, by the one or more processors, the bid counter;
receiving, by the one or more processors, a second action in the user interface, the second action corresponding to a second bid request from the buyer;
comparing, by the one or more processors, the bid counter for the buyer to the updated bid limit;
determining, by the one or more processors, that the bid counter exceeds the updated bid limit; and
based on the determining that the bid counter exceeds the updated bid limit, causing, by the one or more processors, the user interface to reject the second bid request to block the second bid request from executing.

11. The method of claim 10, wherein payment for the item occurs separately from bidding for the item, such that it is possible for the buyer to bid for the item without ever paying for the item.

12. The method of claim 10, wherein the bid limit is based on an assessment of risk that the buyer will not pay for the item after bidding for the item.

13. The method of claim 10, wherein the different pieces of information comprise a risk that the buyer will not pay for the item after bidding for the item by examining buyer location, a payment method on file, or a return on investment for the buyer.

14. The method of claim 10, wherein the unpaid item risk assessment is performed in response to user action.

15. The method of claim 10, wherein the bid limit establishes a limit on a number of outstanding unpaid items that the buyer can have prior to future bids being blocked.

16. The method of claim 15, wherein the limit varies depending on item category.

17. The method of claim 15, wherein the limit varies depending on item price.

18. The method of claim 15, wherein the limit restricts bidding in one or more specific item categories.

19. A non-transitory machine-readable storage medium comprising instructions, which when implemented by one or more machines, cause the one or more machines to perform operations comprising:
receiving a first action in a user interface, the first action corresponding to a first bid request from a buyer in an online auction system;
comparing a bid counter for the buyer to a bid limit;
determining that the bid counter is less than the bid limit;
based on the determining that the bid counter is less than the bid limit, granting the first bid request to allow the bid to execute;
in response to granting the first bid request, accessing information associated with the buyer comprising one or more previous transactions to analyze one or more different pieces of information to perform an unpaid item risk assessment to allow or prevent future bid requests received from the buyer in the online auction system, the bid limit being updated based on the unpaid item risk assessment that has been performed based on the analysis of the different pieces of information associated with the one or more transactions;

incrementing the bid counter;

receiving a second action in the user interface, the second action corresponding to a second bid request from the buyer;

comparing the bid counter for the buyer to the updated bid limit;

determining that the bid counter exceeds the updated bid limit; and based on the determining that the bid counter exceeds the updated bid limit, causing the user interface to reject the second bid request to block the second bid request from executing.

20. The non-transitory machine-readable storage medium of claim 19, wherein payment for the item occurs separately from bidding for the item, such that it is possible for the buyer to bid for the item without ever paying for the item.

\* \* \* \* \*